United States Patent
Tagawa

[19]

[11] Patent Number: 6,001,468
[45] Date of Patent: Dec. 14, 1999

[54] MAGNETIC HEAD

[75] Inventor: Ikuya Tagawa, Kanagawa, Japan

[73] Assignee: Fujitsu Limited, Kawasaki, Japan

[21] Appl. No.: 08/992,380

[22] Filed: Dec. 17, 1997

[30] Foreign Application Priority Data

Jul. 4, 1997 [JP] Japan .................................. 9-180108

[51] Int. Cl.$^6$ .................................................. G11B 5/66
[52] U.S. Cl. .................. 428/332; 428/336; 428/692; 428/694 R; 428/694 TS; 428/900; 428/694 TM; 360/113; 360/126; 324/252
[58] Field of Search .................. 428/692, 694 R, 428/694 TS, 694 TM, 900, 332, 336; 360/113, 126; 324/252

[56] References Cited

U.S. PATENT DOCUMENTS 4,743,491  5/1988  Asada ...................................... 428/213
5,302,459  4/1994  Sugenoya ............................. 428/694 T

FOREIGN PATENT DOCUMENTS 215406    1/1990  Japan .
6124415   5/1994  Japan .
744817    2/1995  Japan .
883408    2/1996  Japan .
8147623   6/1996  Japan .

*Primary Examiner*—Leszek Kiliman
*Attorney, Agent, or Firm*—Greer, Burns & Crain, Ltd.

[57] ABSTRACT

A magnetic head comprises a lower magnetic pole, an insulating film formed on the lower magnetic pole, a coil arranged over the lower magnetic pole so as to penetrate the insulating film, and an upper magnetic pole having a pole at its top end so as to have a clearance against the lower magnetic pole and formed of magnetic material having saturation magnetic flux density Bs (T) and electric resistivity $\rho$ ($\mu\Omega$cm) on the insulating film to have a film thickness $\delta$ ($\mu$m), and both sides of the upper magnetic pole being formed to extend from root portions of the pole at a taper angle $\theta$ (degree), whereby the upper magnetic pole can satisfy a condition of $(1+\tan\theta)\delta Bs/\sqrt{\rho} \leq 1.0$.

10 Claims, 11 Drawing Sheets

——————— Bs , Bsa > Bsb

$\delta_N$ ··· The n-th Magnetic Layer Thickness

MAGNETIC HEAD

BACKGROUND OF THE INVENTION

1. Field of the Invention

The present invention relates to a magnetic head and, more particularly, an induction type magnetic head for use in a magnetic disk drive, a magnetic tape drive, and so forth.

2. Description of the Prior Art

An induction type magnetic head has been employed to record magnetic information on a magnetic disk or a magnetic tape or to reproduce the magnetic information recorded on the magnetic disk or the magnetic tape. However, in recent years, with the practical implementation of magnetoresistive devices, the induction type magnetic heads have often been exclusively used for magnetic recording.

Figure 16A:
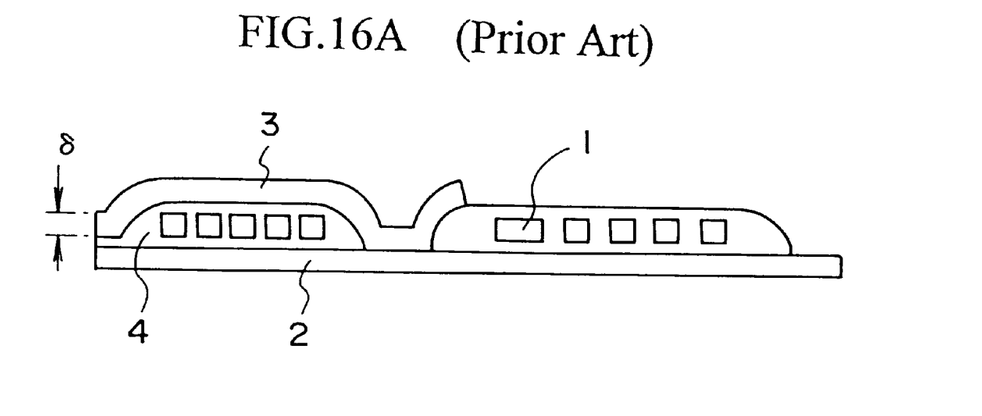
FIG. 16A is a sectional view showing a common induction type magnetic head.
Figure 16B:
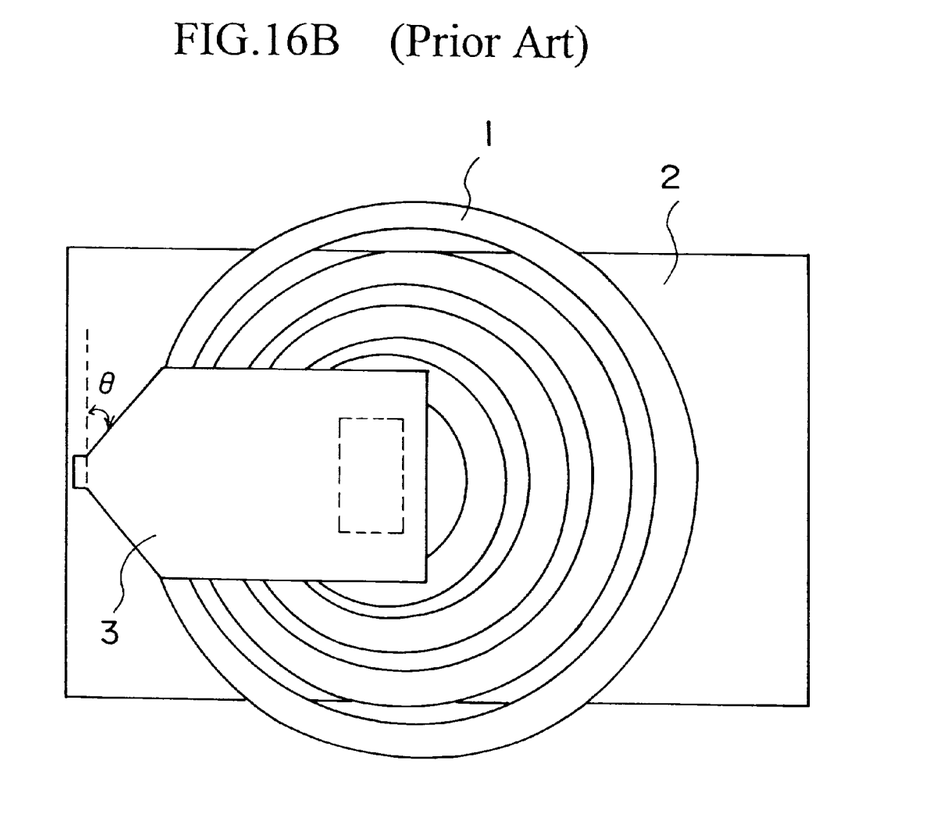
FIG. 16B is a plan view showing the induction type magnetic head from which an insulating layer is omitted.

The induction type magnetic head (inductive head) has in general a cross sectional structure as shown in FIGS. 16A and 16B. A spiral coil 1 is interposed between a lower magnetic pole 2 and an upper magnetic pole 3 via an insulating layer 4. The upper magnetic pole 3 denotes a magnetic pole which is positioned on the side far from a recording track of a magnetic recording medium, i.e., which is made of a film being finally formed.

If the induction type magnetic head is employed in combination with a reproduction only MR magnetic head to which the magnetoresistive device is installed, such a configuration is commonly adopted that the lower magnetic pole of the induction type magnetic head can also serve as an upper shielding layer of the MR magnetic head. Thus, miniaturization of the magnetic head can be attained and also displacement between write position and read position can be prevented from being generated.

In the induction type magnetic head, an infinitesimal gap is formed between top ends of the upper magnetic pole 3 and the lower magnetic pole 2 via the insulating layer 4. The upper magnetic pole 3 is formed to have a narrowly tapered top end, as shown in FIG. 16B. Such tapered slant $\theta$ relative to a surface line of the top end is called a squeezing angle or a taper angle.

Normally a permalloy thin film is employed as a soft magnetic thin film serving as the upper magnetic pole 3. A film thickness $\delta$ of the thin film is about 3.5 to 4.0 $\mu$m and the taper angle $\theta$ is 45 to 55 degrees. Recently, in order to prevent reduction in the recording magnetic field due to a narrower write gap, material with high saturation magnetic flux density (high Bs) such as $Ni_{50}Fe_{50}$ has been employed as the upper magnetic pole 3, or a composite magnetic pole which is made by laminating a high Bs thin film and the permalloy thin film has been employed. However, even in such configuration, the film thickness $\delta$ of the overall upper magnetic pole is 3.0 $\mu$m or more and the taper angle $\theta$ is 30 degrees or more.

By the way, there has been a necessity of driving the recording head at the high frequency of about 100 MHz or more as the recording density is increased in recent years.

In the high frequency induction type magnetic head, dibit resolution has been utilized as an important index to estimate the high recording density characteristic. The dibit resolution can be given by a value ($V_{dibit}/V_{iso}$) which is derived by dividing a recording/reproducing output $V_{dibit}$ composed of only two bits at the high frequency (e.g., 100 MHz) by a recording/reproducing output $V_{iso}$ composed of only two bits at the low frequency (e.g., 10 MHz). In general, a value of 40% or more has been needed as the dibit resolution.

However, in the case that the induction type magnetic head is employed at the high frequency range of more than 100 MHz, sufficient consideration as to the influence of eddy current caused in the writing head (especially, upper magnetic pole) has not been taken in the prior art. As a consequence, the upper magnetic pole is improperly designed for high frequency applications. For purposes of example, the film thickness $\delta$ and the taper angle $\theta$ of the upper magnetic pole are formed excessively large compared to the properties of material used as the upper magnetic pole, such as saturation magnetic flux density Bs, electric resistivity $\rho$, etc. Therefore, it has been believed that it is difficult to improve the recording resolution, etc. by increasing the dibit resolution up to 40% or more in the high frequency band beyond 100 MHz.

SUMMARY OF THE INVENTION

It is an object of the present invention to provide a magnetic head capable of generating recording magnetic fields by a high frequency recording current in excess of 100 MHz with good efficiency to thus implement sufficient recording resolution.

According to the present invention, an upper magnetic pole can be formed to have a configuration to satisfy $(1+\tan\theta)\delta Bs/\sqrt{\rho} \leq 1.0$ under assumptions that the upper magnetic pole having a single-layer structure has saturation magnetic flux density Bs (T), electric resistivity $\rho$ ($\mu\Omega$cm), and a film thickness $\delta$ ($\mu$m) and that both sides of the upper magnetic pole extend at a taper angle $\theta$ (degrees) from root portions of a pole which is formed at its top end of the upper magnetic pole.

In the magnetic head to satisfy such condition, it is made clear by the inventors of the present invention that dibit resolution can exceed more than 40% even if a recording current frequency is set to more than 100 MHz.

Furthermore, in the case that the upper magnetic pole is composed of a plurality of magnetic layers in layer number N, the upper magnetic electrode is formed to have a configuration which can satisfy $(1+\tan\theta)\Sigma_{i=1, N}\delta_i Bs_i/\sqrt{\rho_i} \leq 1.0$ when saturation magnetic flux density $Bsi$ (T), electric resistivity $\rho_i$ ($\mu\Omega$cm), and a film thickness $\delta_i$ ($\mu$m) of the i-th magnetic layer from the lower magnetic pole side are assumed and further the taper angle extending from root portions of the pole which is formed at the top end of the upper magnetic pole is assumed as $\theta$.

In the magnetic head to satisfy such condition, the dibit resolution in excess of more than 40% can also be achieved even if the recording current frequency is set to more than 100 MHz.

In this manner, selection or design of material for the upper magnetic pole which is capable of generating a recording magnetic field with good efficiency by the high frequency recording curent in excess of 100 MHz can be made easy because the conditions to improve the recording resolution have been made clear.

DESCRIPTION OF THE PREFERRED EMBODIMENTS

There will be explained embodiments of the present invention with reference to accompanying drawings hereinafter.

(First Embodiment)

First a composite magnetic head having a structure in which an induction type magnetic head is formed on a magnetoresistive magnetic head will be explained and then optimization of an upper magnetic pole in the induction type magnetic head will be explained in detail hereunder.

Figure 1:
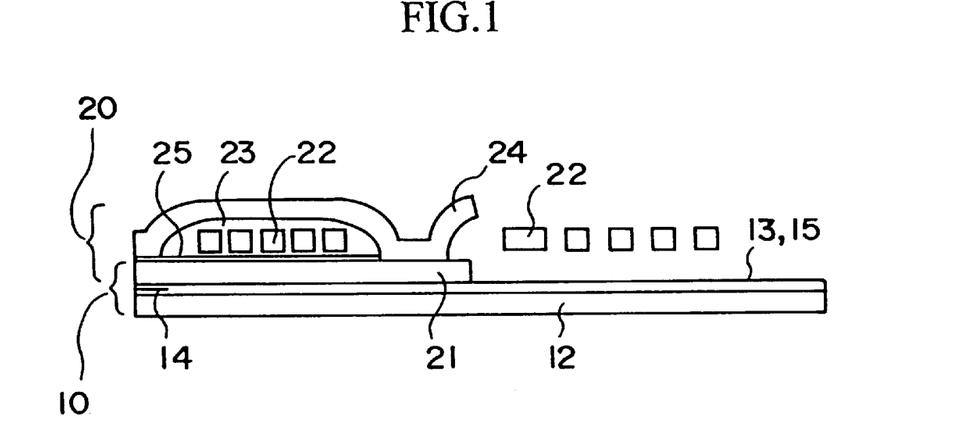
FIG. 1 is a sectional view showing an induction type magnetic head according to a first embodiment of the present invention.
Figure 2:
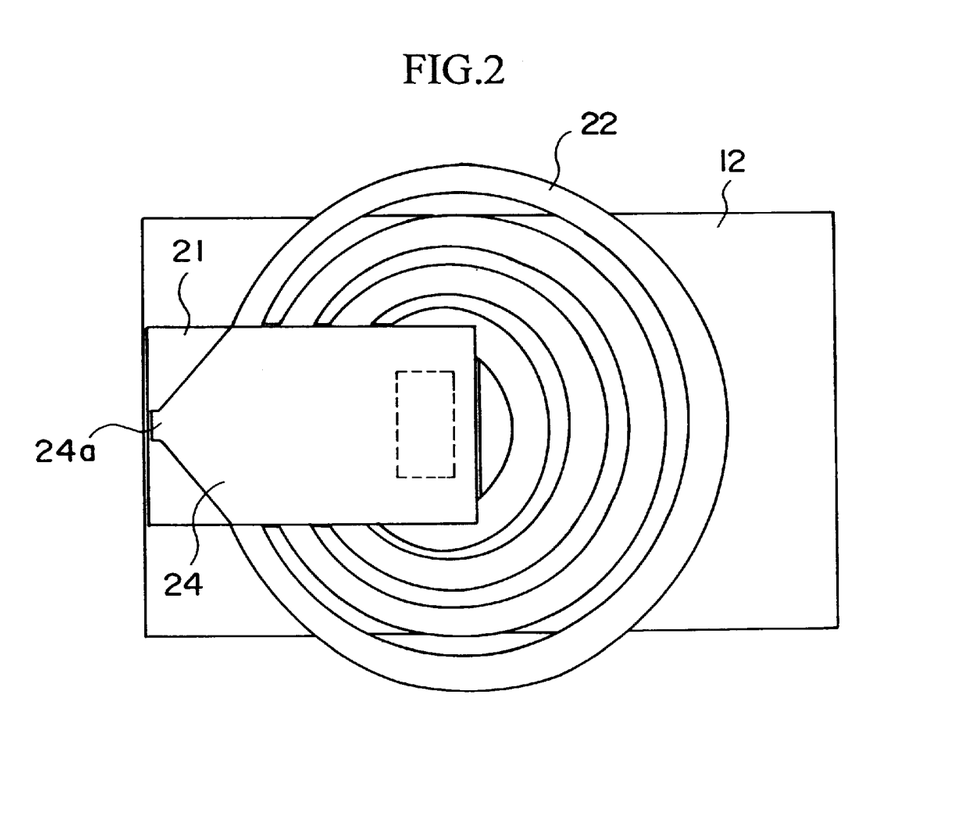
FIG. 2 is a plan view showing the induction type magnetic head according to the first embodiment of the present invention.
Figure 3:
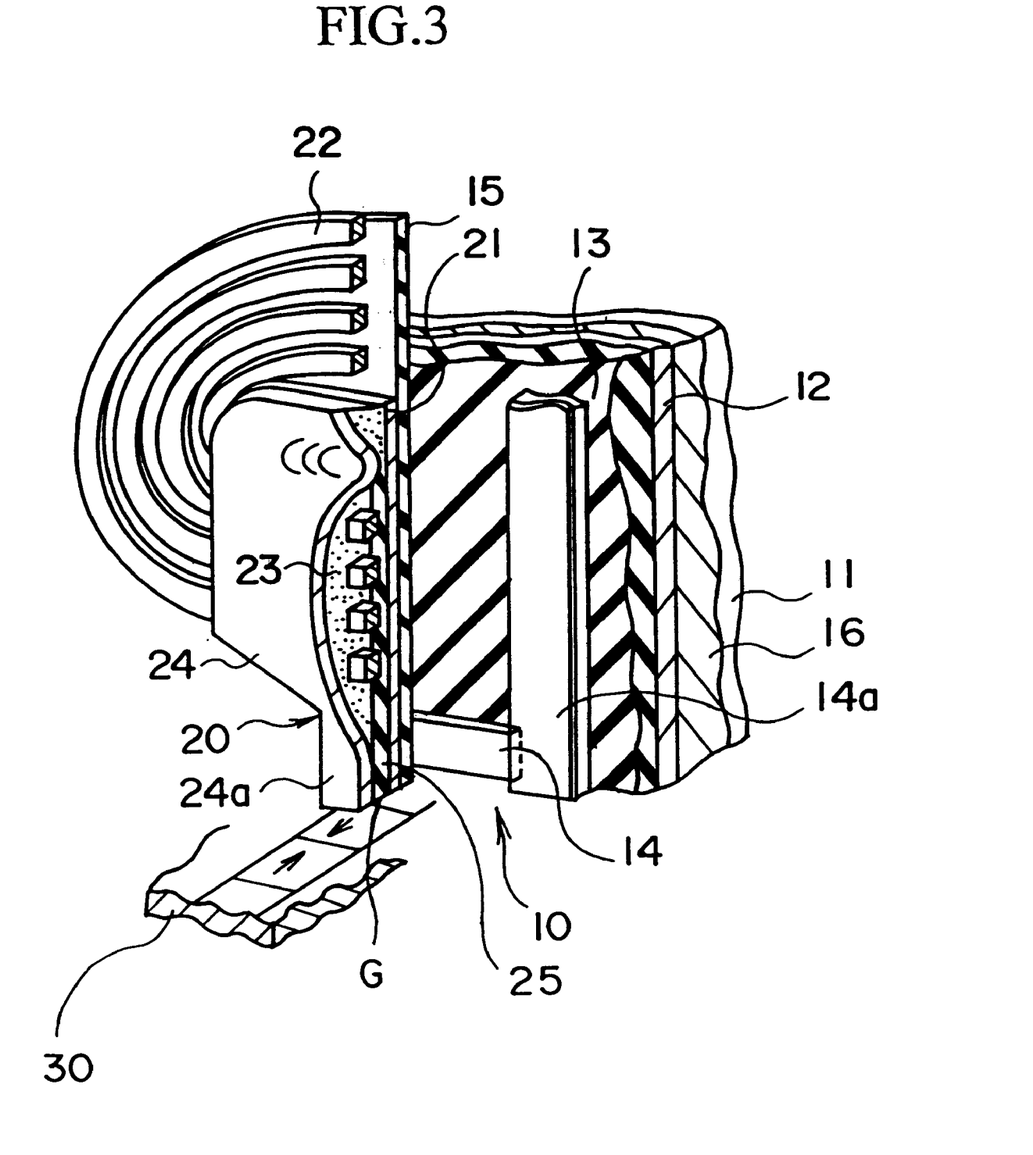
FIG. 3 is a perspective view showing the induction type magnetic head according to the first embodiment of the present invention.

FIG. 1 is a sectional view showing a composite magnetic head according to a first embodiment of the present invention. FIG. 2 is a plan view showing the composite magnetic head shown in FIG. 1. FIG. 3 is a perspective view showing a pertinent portion of the composite magnetic head shown in FIG. 1.

In FIGS. 1 to 3, a reproduction (read) only magnetoresistive (MR) magnetic head 10 and a record (write) and reproduction enable induction type magnetic head 20 are formed in sequence on a head substrate 11.

The MR magnetic head 10 consists of a first magnetic shielding layer 12, a first nonmagnetic insulating film 13, a magnetoresistive device 14, and a second nonmagnetic insulating film 15. A pair of leads 14a are connected to both sides of the magnetoresistive device 14. The magnetoresistive device 14 and the pair of leads 14a are interposed between the first nonmagnetic insulating film 13 and the second nonmagnetic insulating film 15.

In turn, the induction type magnetic head 20 consists of a lower magnetic pole (lower core) layer 21 made of NiFe, for example, a spiral coil 22 for electromagnetic conversion, and an upper magnetic pole (upper core) layer 24, which are formed in sequence on the MR magnetic head 10.

Also, the lower magnetic pole layer 21 has a function as a second magnetic shielding layer of the MR type magnetic head 10. The lower magnetic pole layer 21 is formed on the second nonmagnetic insulating film 15 of the MR magnetic head 10 in an area extending from a top end of the magnetoresistive device 14 to a central portion of the spiral coil 22. The lower magnetic pole layer 21 may also be formed separately from the second magnetic shielding layer of the MR type magnetic head 19.

A gap layer 25 made of about 0.2 $\mu$m thick $Al_2O_3$, and so forth is formed on the lower magnetic pole layer 21.

An insulating layer 23 is interposed between the lower magnetic pole layer 21 and the upper magnetic pole layer 24. The insulating layer 23 covers a part of the spiral coil 22 which is formed to protrude from the upper magnetic pole layer 24. The insulating layer 23 can thus isolate the spiral coil 22 from the lower magnetic pole layer 21 and the upper magnetic pole layer 24. In addition, a central portion of the lower magnetic pole layer 21 and an end portion of the upper magnetic pole layer 24 are connected to each other so as to penetrate a central portion of the spiral coil 22, the insulating layer 23, and the gap layer 25, but are separated from each other on the outside of the spiral coil 22.

As a consequence, a combined sectional shape of the lower magnetic pole layer 21 and the upper magnetic pole layer 24 has substantially a "C-character" shape.

Figure 4:
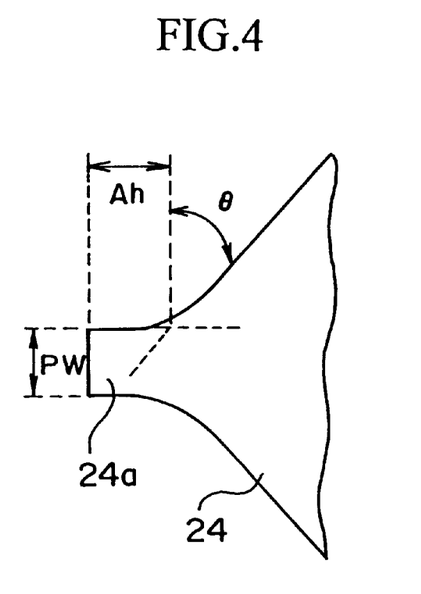
FIG. 4 is a plan view showing a pole of an upper magnetic pole and its periphery of the induction type magnetic head according to the first embodiment of the present invention.

The upper magnetic pole layer 24 is formed of magnetic material such as NiFe, CoNiFeS, etc. and has its saturation magnetic flux density Bs. The upper magnetic pole layer 24 is formed to have a substantially pentagonal plan shape, as shown in FIG. 4. A pole 24a having an Ah $\mu$m length and a PW $\mu$m width is extended from one corner of such pentagonal plan shape toward the outside of the spiral coil 22 so as to reach a top end of the induction type magnetic head 20. The pole 24a is isolated from the lower magnetic pole layer 21 by the gap layer 25, so that a clearance between the pole 24a and the lower magnetic pole layer 21 serves as a recording or reproducing gap g. The gap g corresponds to a film thickness of the gap layer 25.

Figure 5:
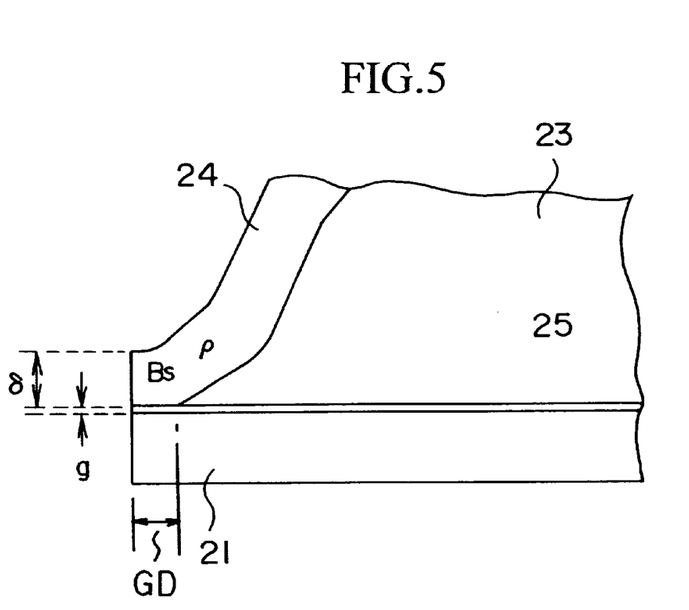
FIG. 5 is a sectional view showing a top end of the upper magnetic pole and its periphery of the induction type magnetic head according to the first embodiment of the present invention.

In addition, as shown in FIG. 4, both side lines extending from the root portions of the pole 24a are inclined relative to a top end surface of the pole 24a at a taper angle $\theta$ respectively. As shown in FIG. 5, the film thickness (pole length) of the pole 24a is represented by $\delta$ and electric resistivity is represented by $\rho$.

In FIG. 3, a reference numeral 16 denotes a nonmagnetic insulating film formed between the substrate 11 and the MR type magnetic head 10, and a reference numeral 30 denotes a magnetic recording medium.

In the induction type magnetic head 20 having the above configuration, it is difficult to directly correlate the dibit resolution with these parameters in the event that relationships between the dibit resolution and the upper magnetic pole layer parameters are to be detected.

Figure 6A:
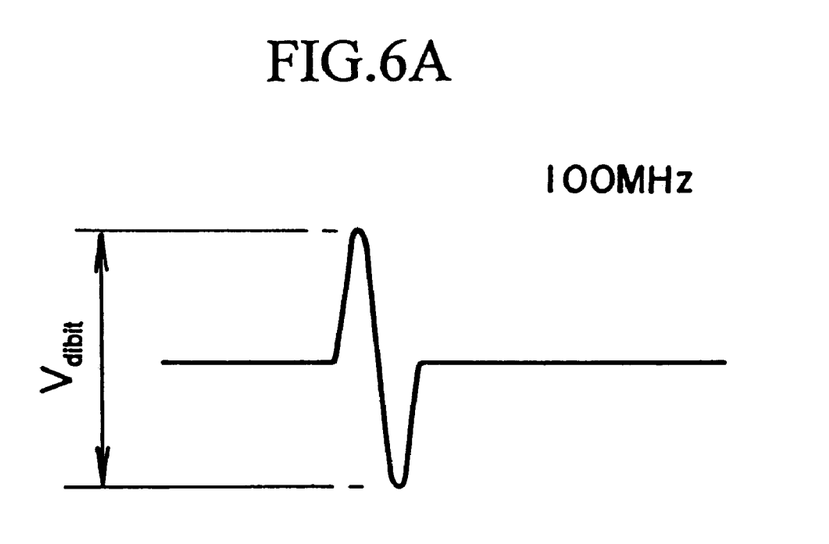
FIGS. 6A and 6B are waveform diagrams illustrating two bits at a high recording current frequency and two bits at a low recording current frequency respectively.
Figure 6B:
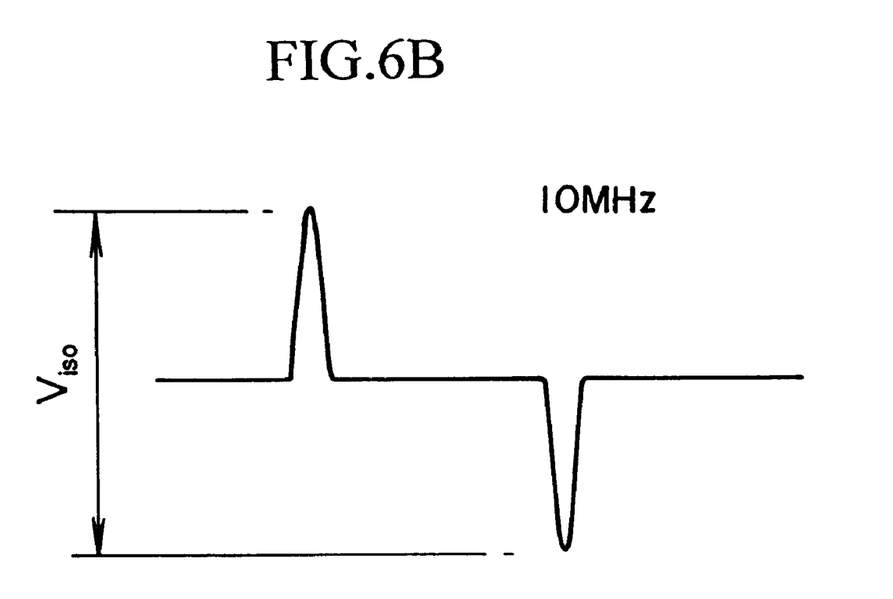

The dibit resolution α is an important index to determine the high recording density characteristic. For example, the dibit resolution α can be given as a value ($\alpha = V_{dibit}/V_{iso}$) which is derived by dividing a recording/reproducing output $V_{dibit}$ composed of only two bits at the high frequency, as shown in FIG. 6A, by a recording/reproducing output $V_{iso}$ composed of only two bits at the low frequency, as shown in FIG. 6B. Where the high frequency is set to 100 MHz and the low frequency is set to 1 MHz.

Figure 7:
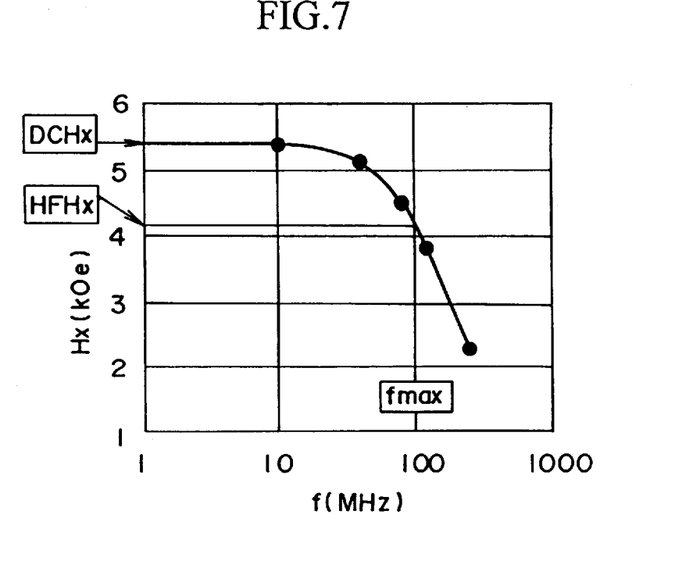
FIG. 7 is a graph showing a relationship between a recording current signal frequency and a recording magnetic field intensity in the first embodiment of the present invention.

Then, a simulation of a relationship between a frequency f and a recording magnetic field intensity Hx in the induction type magnetic head 20 yields a characteristic shown in FIG. 7. Where a ratio of a high frequency magnetic field intensity (HFHx) and a low frequency magnetic field intensity (DCHx) is called a high frequency magnetic field attenuation factor which is then represented by β (β=HFHx/DCHx) herein. Where the high frequency is set to 100 MHz and the low frequency is set to 1 MHz.

Figure 8:
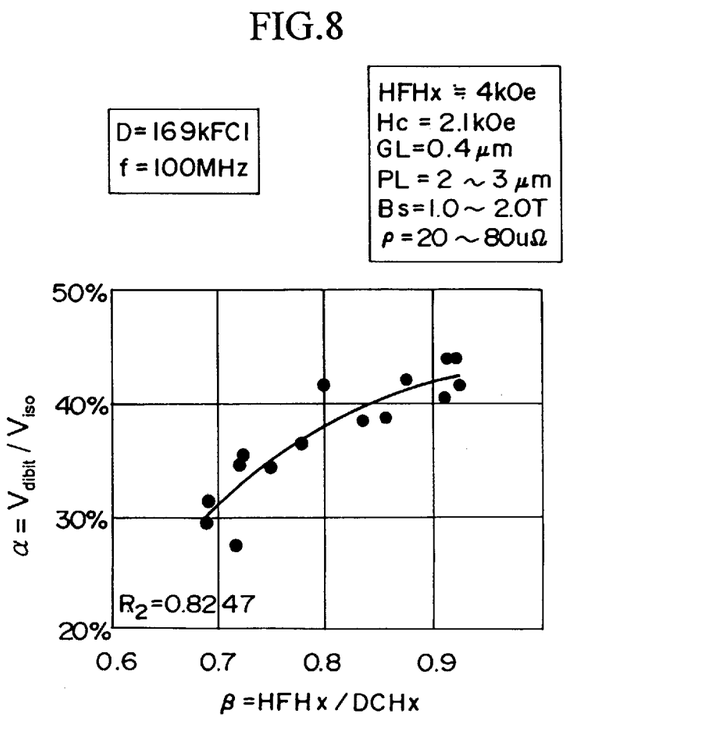
FIG. 8 is a graph showing a relationship between dibit resolution and a high frequency magnetic field attenuation factor.

A substantially proportional relationship, as shown in FIG. 8, for example, can be derived between the dibit resolution α and the high frequency magnetic field attenuation factor β. It can be understood from FIG. 8 that the dibit resolution α also becomes larger as the attenuation factor β becomes larger. Therefore, if relationships between the high frequency magnetic field attenuation factor β (HFHx/DCHx) and the taper angle θ, the film thickness δ, the electric resistivity ρ and the saturation magnetic flux density Bs can be detected, then relationships between the dibit resolution α and the above various parameters can also be detected.

As various parameters of the upper magnetic poles 24 to examine the relationship shown in FIG. 8, a high frequency of 100 MHz, a recording density D of 169 kFCI, recording magnetic field intensity HFHx of about 4 kOe at the frequency 100 MHz, saturation magnetic field Hc of the magnetic recording medium of 2.1 kOe, gap GL of 0.4 μm, a pole thickness (length) PL of 2 to 3 μm, saturation magnetic flux density Bs of 1.0 to 2.0 T, and electric resistivity ρ of 20 to 80 μΩcm have been selected respectively.

Normally, the high frequency magnetic field attenuation factor β in excess of 0.85 is needed from FIG. 8 because the dibit resolution α of more than 40% must be required.

Indeed, in the prior art device which is used at the frequency of less than 50 MHz, the high frequency magnetic field attenuation factor β at 50 MHz, i.e., the maximum recording frequency, has been set such that β≧0.85. Hence, it has been appreciated that this value of the attenuation factor β can satisfy the above conditions.

However, since the influence of eddy current should be taken into account if the operating frequency exceeds 100 MHz, conditions of the parameters to satisfy β≧0.85 have not been definite yet in the prior art. For the above reason, the recording resolution characteristic at the high frequency must be improved. Thus, such conditions will be discussed hereunder.

Figure 9:
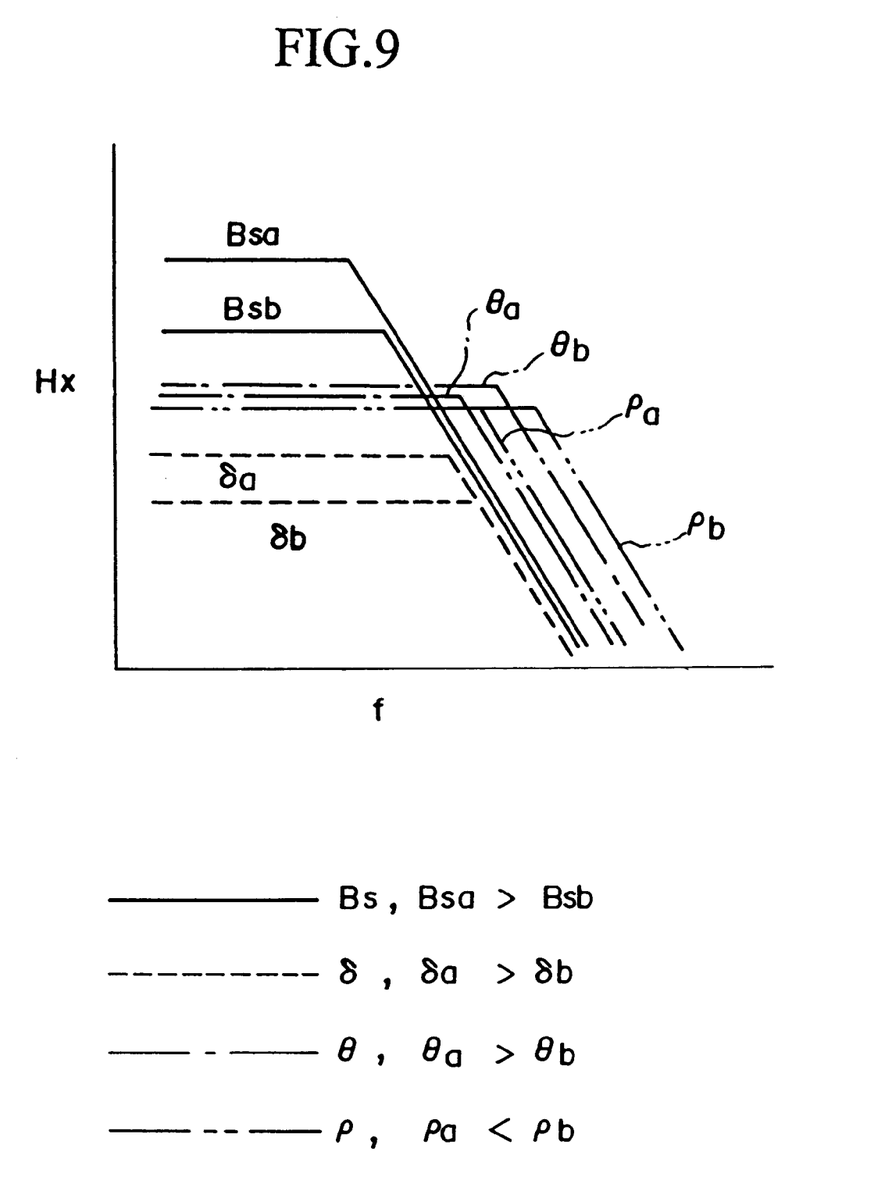
FIG. 9 is a graph showing how characteristic curves shown in FIG. 7 are changed according to various parameters of the upper magnetic pole in the induction type magnetic head.

Therefore, inventors of the present invention have examined how the characteristic curves indicating the relationship between the recording magnetic field intensity Hx and the recording current signal frequency f are varied according to the magnitudes of the above parameters. Results as shown in FIG. 9 have been derived. In other words, the high frequency magnetic field attenuation factor β must be enhanced to improve the frequency characteristic. To that end, it has been found that the saturation magnetic flux density Bs should be made small, the film thickness δ should be made small, the taper angle θ should be made small, and the electric resistivity ρ should be made large.

It can be found that the high frequency magnetic field attenuation factor β, if examined in more detail based on the above results, is in reciprocal proportion to a factor (1+tan θ)δBs/√ρ including θ, δ, Bs, and ρ (referred to as a "magnetic pole high frequency characteristic factor" hereinafter) and that the high frequency characteristic in excess of 100 MHz can be improved when this factor can be reduced less than 1. Such condition can be given by $$(1 + \tan\theta)\delta Bs / \sqrt{\rho} \leq 1.0 \qquad (1)$$

Accordingly, in the case that saturation magnetic flux density Bs and the electric resistivity ρ are determined by selecting magnetic material, the recording frequency characteristic can be improved by thinning the film thickness δ, reducing the taper angle θ, or executing both of them to meet the condition given by Eq.(1).

In the prior art, the permalloy thin film has been used as the soft magnetic thin film serving as the upper magnetic pole 24, the saturation magnetic flux density Bs is set to 1.0 T, and the electric resistivity ρ is set to 20 μΩcm. The upper magnetic pole 24 made of permalloy is formed to have the film thickness δ of 3.5 to 4.0 μm and the taper angle θ of 45 to 55 degrees.

In recent years, in order to prevent reduction in the recording magnetic field due to the narrower write gap, in some cases, high Bs material such as $Ni_{50}Fe_{50}$ has been employed as the upper magnetic pole, otherwise the composite film magnetic pole formed by laminating the high Bs material thin film and the permalloy thin film has been employed. In such cases, commonly the film thickness δ of the overall upper magnetic pole is more than 3.0 μm and the taper angle θ is more than 30 degrees.

Therefore, when the magnetic pole high frequency characteristic factors of the induction type magnetic heads in the prior art are calculated, results shown in Table I can be derived. It can be found from Table I that the magnetic pole high frequency characteristic factors exceed 1 in all magnetic heads including an up-to-date composite magnetic head, and therefore do not meet the condition given by Eq.(1).

TABLE I

|  | NiFe Head | High Bs Head | Composite Head |
|---|---|---|---|
| Magnetic pole thickness (Main magnetic layer) δ (μm) | 3.5 | 3 | 2.5 |
| Saturation magnetic flux density (Main) Bs (T) | 1 | 1.5 | 1 |
| Electric resistivity (Main) ρ (μΩcm) | 20 | 40 | 20 |
| Sub magnetic layer thickness $\delta_2$ (μm) | — | — | 0.5 |
| Saturation magnetic flux density (Sub) $Bs_1$ (T) | — | — | 1.5 |

TABLE I-continued

|  | NiFe Head | High Bs Head | Composite Head |
|---|---|---|---|
| Electric resistivity (Sub) $\rho_1$ ($\mu\Omega$cm) | — | — | 40 |
| Taper angle $\theta$ (deg) | 55 | 45 | 30 |
| Gap depth GD ($\mu$m) | 1.5 | 1 | 1 |
| Gap length g ($\mu$m) | 0.5 | 0.4 | 0.4 |
| Factor $(1 + \tan\theta)\delta Bs / \sqrt{\rho}$ | 1.9 | 1.42 | 1.25 |

Accordingly, as described in the prior art column of this disclosure, it can be made clear as numerical values that the recording performance has been degraded at the high frequency range exceeding 100 MHz in the conventional induction type magnetic head.

Figure 10:
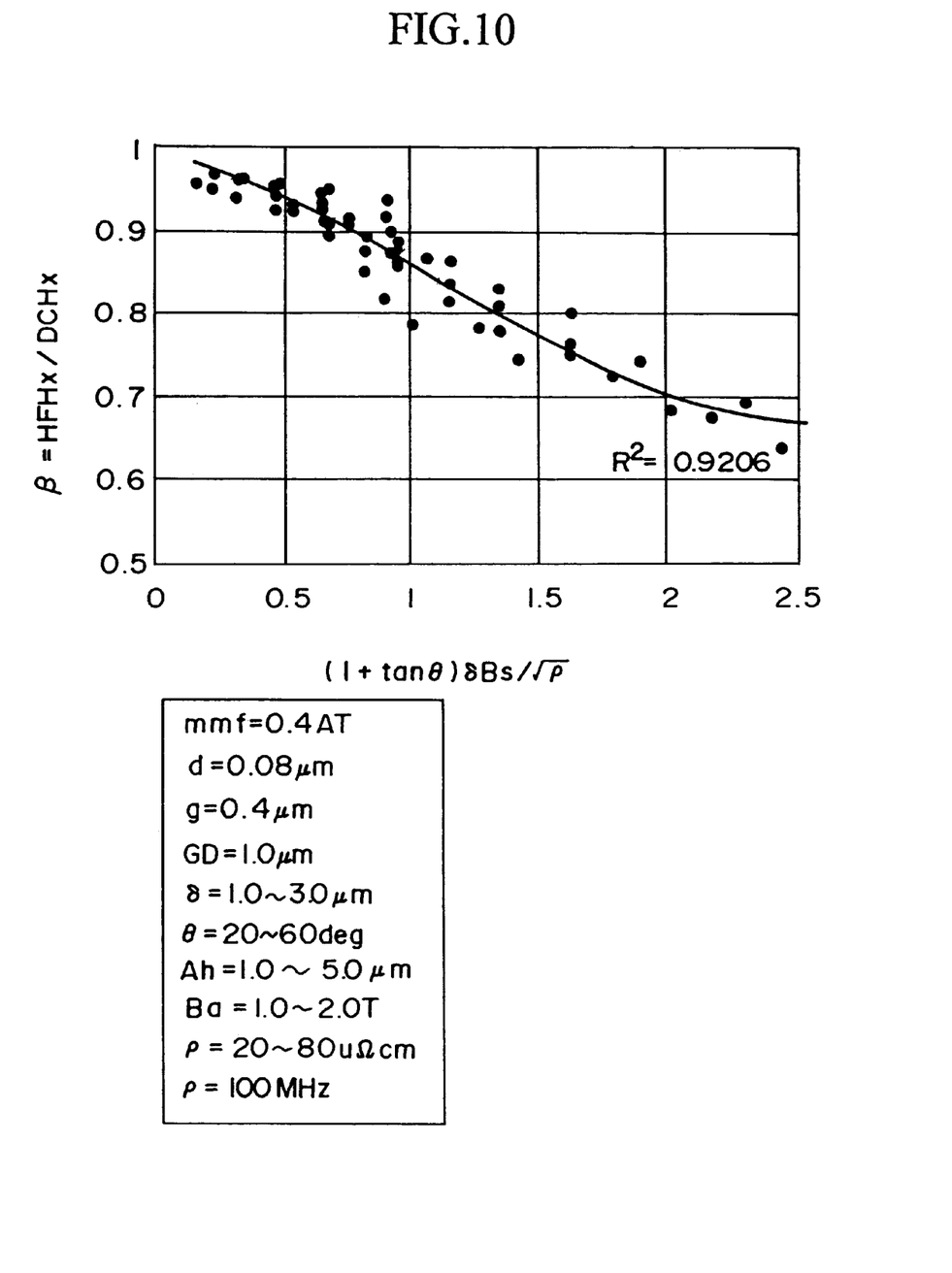
FIG. 10 is a graph showing the high frequency magnetic field attenuation factor derived according to changes in parameters of the upper magnetic poles having a single-layer structure in the induction type magnetic head according to the first embodiment of the present invention.

Next, when a relationship between the magnetic pole high frequency characteristic factor $(1+\tan\theta)\delta Bs/\sqrt{\rho}$ and the high frequency magnetic field attenuation factor $\beta$ is examined while changing various parameters, results shown in FIG. 10 have been obtained.

As the parameters of the induction type magnetic head employed to achieve the characteristic shown in FIG. 10, the saturation magnetic flux density Bs of 1.0 to 2.0 T, the electric resistivity $\rho$ of 20 to 80 $\mu\Omega$cm, the high frequency f of 100 MHz, the taper angle $\theta$ of 20 to 60 degrees, the upper magnetic pole film thickness $\delta$ of 1.0 to 3.0 $\mu$m, the pole length Ah of 1.0 to 5.0 $\mu$m, the gap g of 0.4 $\mu$m between the upper magnetic pole layer and the lower magnetic pole layer, the gap depth GD of 1.0 $\mu$m, a magnetic spacing d of 0.08 $\mu$m between head media, and a magnetomotive force mmf of 0.4 AT have been selected. In addition, the upper magnetic pole layer 24 has been formed of a single-layer magnetic thin film.

It can be derived from FIG. 10 that, if the magnetic pole high frequency characteristic factor $(1+\tan\theta)\delta Bs/\sqrt{\rho}$ is set below 1, the high frequency magnetic field attenuation factor $\beta$ can be increased more than 0.85.

Consequently, as described above, satisfying at least Eq.(1) makes it possible to manufacture a recording magnetic head which can provide the dibit resolution of more than 40% in the high frequency range of more than 100 MHz to thus generate a satisfactory recording magnetic field, i.e., provide the high recording resolution in the high frequency range. Taking account of the above, $$\delta Bs / \sqrt{\rho} \leq 0.5 \qquad (2)$$

should be satisfied since the taper angle $\theta$ ranges between 30 and 45 degrees if the same planar shapes of the upper magnetic pole layer 24 and the pole 24a as those in the prior art are employed.

If this magnetic head is employed for the magnetic disk which is used less than 100 MHz, the recording resolution can be obtained above the quite sufficient level.

(Second Embodiment)

Figure 11:
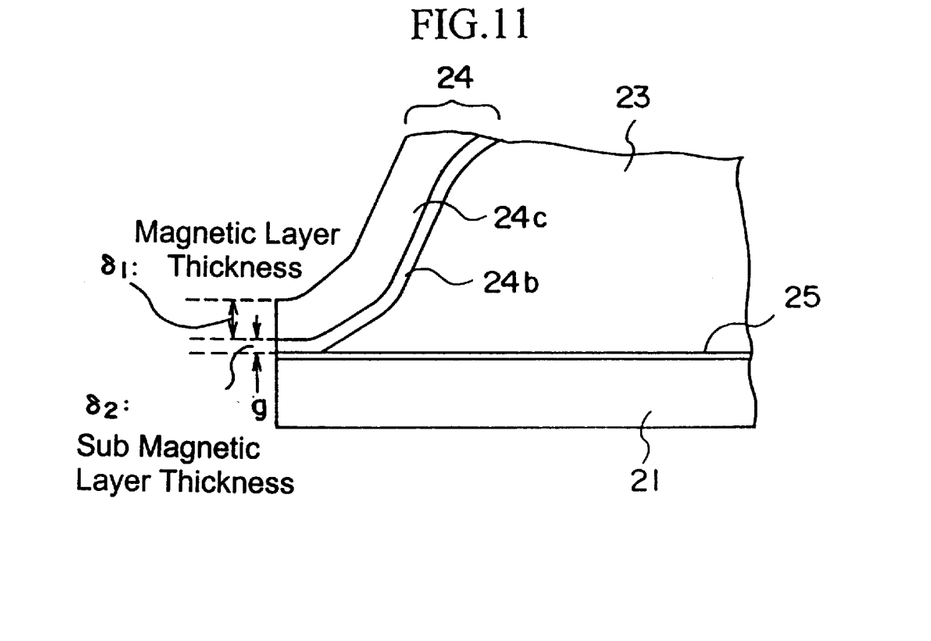
FIG. 11 is a sectional view showing a top end portion of an upper magnetic pole having a double-layered structure magnetic layer in the induction type magnetic head according to a second embodiment of the present invention.

The upper magnetic pole layer in the induction type magnetic head has been formed as the single-layer structure in the above first embodiment, but a composite magnetic film structure as shown in FIG. 11 may be employed.

In the upper magnetic pole layer 24 with the composite magnetic film structure, usually a sub magnetic thin film 24b with high Bs is formed as the first magnetic layer to be positioned in the vicinity of the lower magnetic pole layer 21, and then a main magnetic layer 24c of a film thickness relatively thicker than that of the sub magnetic thin film 24b is deposited on the sub magnetic thin film 24b.

CoNiFe, $Ni_{50}Fe_{50}$, or the like, for example, may be utilized as the sub magnetic thin film 24b. Also, permalloy ($Ni_{80}Fe_{20}$), for example, may be utilized as the sub magnetic thin film 24b.

Figure 12:
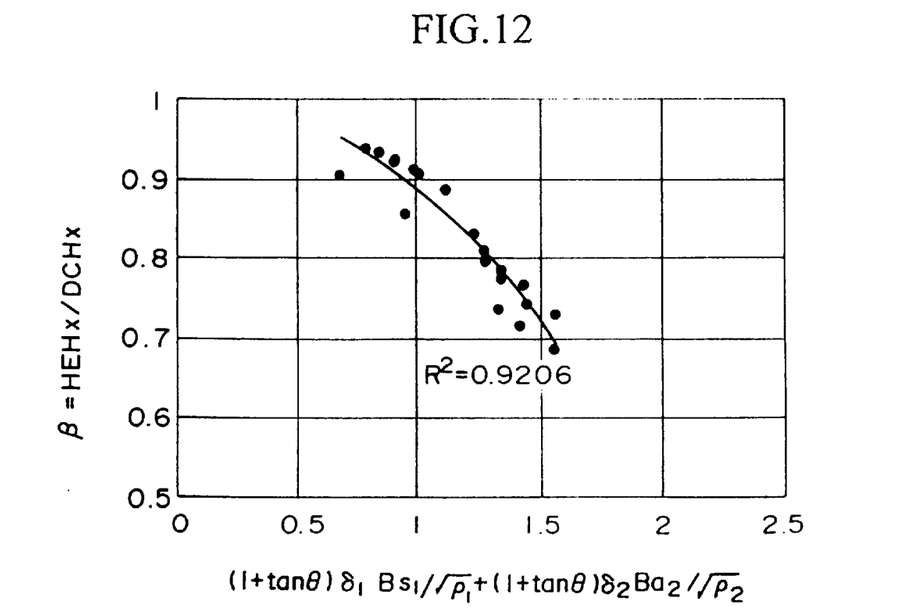
FIG. 12 is a graph showing the high frequency magnetic field attenuation factor derived according to changes in the parameters of the upper magnetic poles in the induction type magnetic head having the structure shown in FIG. 11.

In the case that such composite magnetic film structure is employed, when the magnetic pole high frequency characteristic factor $(1+\tan\theta)\delta_1 Bs_1/\sqrt{\rho_1}$ of the main magnetic thin film 24c and the magnetic pole high frequency characteristic factor $(1+\tan\theta)\delta_2 Bs_2/\sqrt{\rho_2}$ of the sub magnetic layer 24b are calculated and then a relationship between a sum of the magnetic pole high frequency characteristic factors $(1+\tan\theta)\delta_1 Bs_1/\sqrt{\rho_1}+(1+\tan\theta)\delta_2 Bs_2/\sqrt{\rho_2}$ and the high frequency magnetic field attenuation factor $\beta$ is examined, results shown in FIG. 12 have been derived. It should be appreciated from FIG. 12 that, if the sum of the magnetic pole high frequency characteristic factors $(1+\tan\theta)\delta_1 Bs_1/\sqrt{\rho_1}+(1+\tan\theta)\delta_2 Bs_2/\sqrt{\rho_2}$ of the main magnetic layer 24c and the sub magnetic thin film 24b can be lessened lower than 1.2, it is possible to reduce the high frequency magnetic field attenuation factor $\beta$ less than 0.85. In other words, it would be appreciated that, if the upper magnetic pole layer 24 which can satisfy a relationship given by a following Eq.(3) is provided, the recording magnetic head with the high recording resolution in the high frequency range can be accomplished.

$$(1 + \tan\theta)\delta_1 Bs_1 / \sqrt{\rho_1} + (1 + \tan\theta)\delta_2 Bs_2 / \sqrt{\rho_2} \leq 1.2 \qquad (3)$$

In this case, like the first embodiment, in order to make it easy to determine the conditions for the high recording resolution, the sum of the magnetic pole high frequency characteristic factors may expressed as the condition given by $$(1 + \tan\theta)\delta_1 Bs_1 / \sqrt{\rho_1} + (1 + \tan\theta)\delta_2 Bs_2 / \sqrt{\rho_2} \leq 1.0 \qquad (4)$$

In Eqs.(3) and (4), $\delta_1$ denotes a film thickness of the main magnetic layer 24c; $Bs_1$, saturation magnetic flux density of the main magnetic layer 24c; $\rho_1$, electric resistivity of the main magnetic layer 24c; $\delta_2$, a film thickness of the sub magnetic layer 24b; $Bs_2$, saturation magnetic flux density of the sub magnetic layer 24b; and $\rho_2$, electric resistivity of the sub magnetic layer 24b.

As the parameters of the induction type magnetic head employed to achieve the characteristic shown in FIG. 12, the saturation magnetic flux density Bs of 1.0 to 2.0 T, the electric resistivity $\rho$ of 20 to 80 $\mu\Omega$cm, the high frequency f of 100 MHz, the taper angle $\theta$ of 20 to 60 degrees, the upper magnetic pole film thickness $\delta$ of 1.0 to 3.0 $\mu$m, the pole length Ah of 1.0 to 5.0 $\mu$m, the gap g of 0.4 $\mu$m between the upper magnetic pole layer and the lower magnetic pole layer, the gap depth GD of 1.0 $\mu$m, a magnetic spacing d of 0.08 $\mu$m between head media, and a magnetomotive force mmf of 0.4 AT have been selected.

Figure 13:
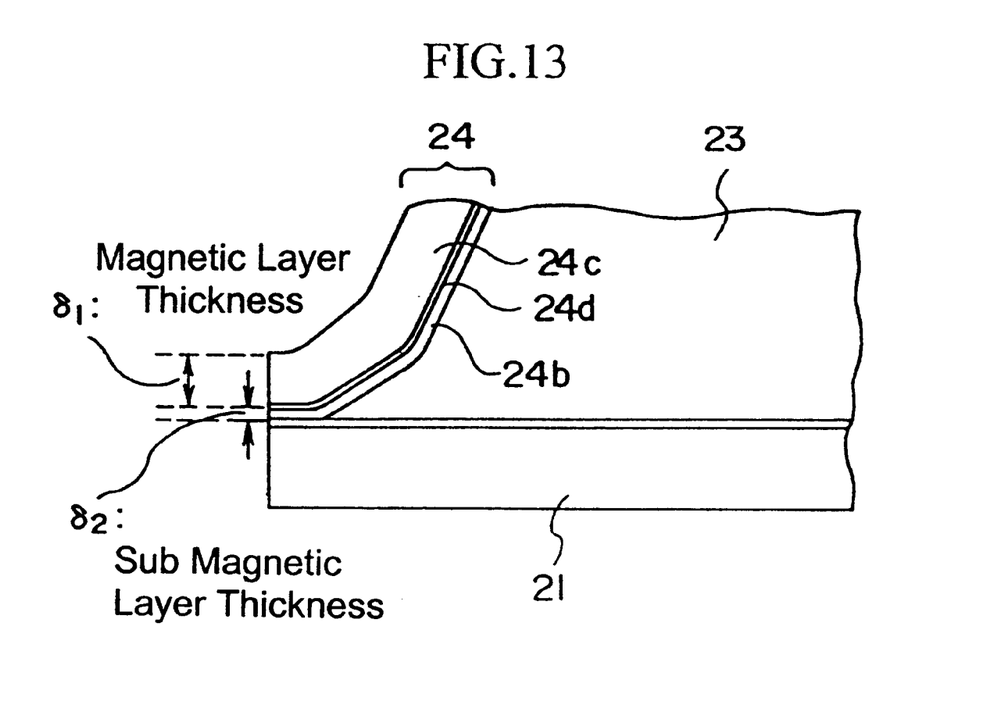
FIG. 13 is a sectional view showing a configuration in which an insulating layer is interposed between the double-layered structure magnetic layers of the upper magnetic pole shown in FIG. 11.
Figure 15:
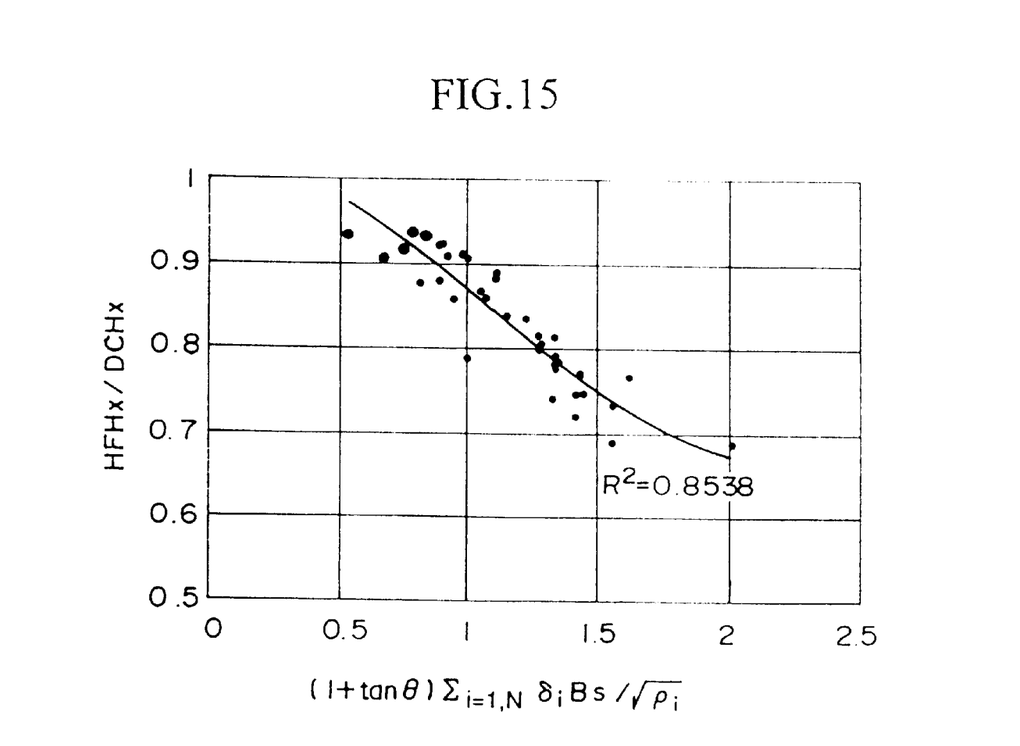
FIG. 15 is a graph showing the high frequency magnetic field attenuation factor derived according to changes in the parameters of the upper magnetic poles in the induction type magnetic head having the structure shown in FIG. 14.

In the above relationships, as shown in FIG. 15, the conditions given by Eqs.(3) and (4) are in no way varied even if an insulating intermediate layer 24d made of $Al_2O_3$, etc. is interposed between the main magnetic layer 24c and the sub magnetic layer 24b. If such insulating intermediate layer 24d is interposed, FeN, FeZrN, and others may be selected as material of the sub magnetic layer 24b.

(Third embodiment)

Figure 14:
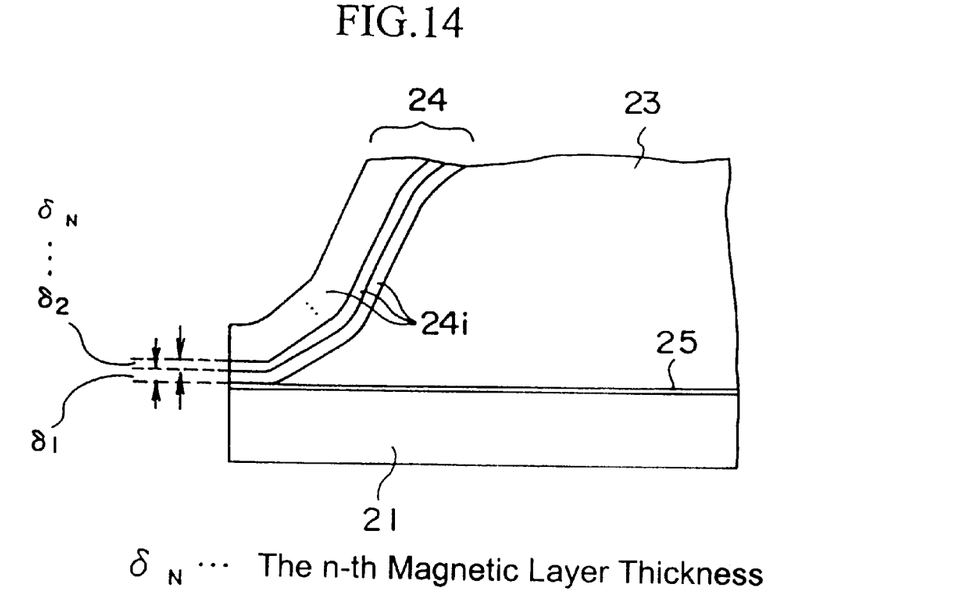
FIG. 14 is a sectional view showing a top end portion of an upper magnetic pole having a multi-layered magnetic structure in the induction type magnetic head according to a third embodiment of the present invention.

As the upper magnetic pole layer of the induction type magnetic head, as shown in FIG. 14, a multi-layered magnetic film structure which is formed by laminating two layers or more consisting of two kinds or more of soft magnetic materials may be adopted.

If the multi-layered magnetic film structure is employed, there are NiFe, CoNiFeS, FeZrN, etc., for example, as the magnetic material. As materials for magnetic layers, a material whose property is changed by the process such as surface oxidation conducted after film formation may be counted as one kind of such materials.

If the multi-layered magnetic film structure is also employed, conditions to improve the high recording resolution capability in the high frequency range can be given as follows.

In the case of the multi-layered magnetic film structure, when a relationship between a sum of the magnetic pole high frequency characteristic factors of respective magnetic layers $24i$ constituting the upper magnetic pole layer $24$ and the high frequency magnetic field attenuation factor $\beta$ is examined, results as shown in FIG. 15 have been derived. According to FIG. 15, if the sum of the magnetic pole high frequency characteristic factors of respective magnetic layers $24i$ can be made less than 1.1, the high frequency magnetic field attenuation factor $\beta$ can be lowered less than 0.85. That is to say, with the use of the upper magnetic pole layer $24$ capable of satisfying the relationship given by Eq.(5), it is feasible to manufacture the recording magnetic head with the high recording resolution.

$$(1+\tan\theta)\sum_{i=1,N} \delta_i Bs_i / \sqrt{\rho_i} \leq 1.1 \qquad (5)$$

In this case, like the first embodiment, in order to make it easy to determine the conditions of the high recording resolution, the magnetic pole high frequency characteristic factors may be given by $$(1+\tan\theta)\sum_{i=1,N} \delta_i Bs_i / \sqrt{\rho_i} \leq 1.0 \qquad (6)$$

In Eqs.(5) and (6), N denotes a total superposed layer number of the magnetic layers $24i$; i, sequence of the magnetic layers from the lower magnetic pole $21$ side; $\delta_i$, film thickness of the i-th magnetic layer $24i$; Bsi, saturation magnetic flux density of the i-th magnetic layer $24i$; and $\rho_i$, i-th electric resistivity of the magnetic layer $24i$.

As the parameters of the induction type magnetic head employed to achieve the characteristic shown in FIG. 15, the saturation magnetic flux density Bs of 1.0 to 2.0 T, the electric resistivity $\rho$ of 20 to 80 $\mu\Omega$cm, the high frequency f of 100 MHz, the taper angle $\theta$ of 20 to 60 degrees, the upper magnetic pole film thickness $\delta$ of 1.0 to 3.0 $\mu$m, the pole length Ah of 1.0 to 5.0 $\mu$m, the gap g of 0.4 $\mu$m between the upper magnetic pole layer and the lower magnetic pole layer, the gap depth GD of 1.0 $\mu$m, a magnetic spacing d of 0.08 $\mu$m between head media, and a magnetomotive force mmf of 0.4 AT have been selected.

What is claimed is:

1. A magnetic head comprising:
    a lower magnetic pole;
    an insulating film formed on said lower magnetic pole;
    a coil arranged over said lower magnetic pole so as to penetrate through said insulating film; and
    an upper magnetic pole having two sides and a pole at its top end so as to have a clearance against said lower magnetic pole, and formed of magnetic material having saturation magnetic flux density Bs (T) and electric resistivity $\rho$ ($\mu\Omega$cm) on said insulating film to have a film thickness $\delta$ ($\mu$m), both sides of said upper magnetic pole being formed to extend from root portions of said pole at a taper angle $\theta$ (degrees);
    wherein said upper magnetic pole can satisfy a condition of $(1+\tan\theta)\delta Bs/\sqrt{\rho} \leq 1.0$.

2. A magnetic head according to claim 1, wherein said upper magnetic pole is made of either NiFe or CoNiFeS.

3. A magnetic head according to claim 1, wherein said saturation magnetic flux density is within a range of 1.5 to 2.0 T.

4. A magnetic head according to claim 1, wherein said electric resistivity is within a range of 20 to 100 $\mu\Omega$cm.

5. A magnetic head comprising:
    a lower magnetic pole;
    an insulating film formed on said lower magnetic pole;
    a coil arranged over said lower magnetic pole so as to penetrate through said insulating film; and
    an upper magnetic pole having two sides and a pole at its top end so as to have a clearance against said lower magnetic pole, and made of a plurality of magnetic layers superposed on said insulating film in layer number N (N$\geq$1), both sides of said upper magnetic pole being formed to extend from root portions of said pole at a taper angle $\theta$ (degrees);
    wherein i-th magnetic layer of said plurality of magnetic layers constituting said upper magnetic pole from said lower magnetic pole has a saturation magnetic flux density Bs$_i$ (T), electric resistivity p$_i$ ($\mu\Omega$cm), and a film thickness $\delta_i$ ($\mu$m), and
    said upper magnetic pole can satisfy a condition of $(1+\tan\theta)\Sigma_{i=1,N}\delta_i Bs_i/\sqrt{\rho_i} \leq 1.0$.

6. A magnetic head according to claim 5, further comprising a nonmagnetic insulating film interposed between at least two layers of a plurality of said magnetic layers constituting said upper magnetic pole.

7. A magnetic head according to claim 6, wherein said nonmagnetic insulating film is formed of $Al_2O_3$.

8. A magnetic head according to claim 5, wherein said plurality of magnetic layers is selected from a group consisting of NiFe, FeN, FeZrN, and CoNiFeS.

9. A magnetic head according to claim 5, wherein said saturation magnetic flux density is within a range of 1.5 to 2.0 T.

10. A magnetic head according to claim 5, wherein said electric resistivity is within a range of 20 to 100 $\mu\Omega$cm.

* * * * *

UNITED STATES PATENT AND TRADEMARK OFFICE
CERTIFICATE OF CORRECTION

PATENT NO. : 6,001,468
DATED : December 14, 1999
INVENTOR(S) : Tagawa

It is certified that error appears in the above-indentified patent and that said Letters Patent is hereby corrected as shown below:

<u>On the Face of the Patent</u>:

Under "[56] References Cited U.S Patent Documents" please delete "5,302,469  4/1994 Sugenoya. . . .428/694 T" and insert --5,302,459 4/1994 Sugenoya et al. . . . .428/694 T-- therefor Signed and Sealed this Third Day of April, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 6,001,468
DATED : December 14, 1999
INVENTOR(S) : Tanaka et al.

It is certified that error appears in the above-indentified patent and that said Letters Patent is hereby corrected as shown below:

<u>On the Face of the Patent</u>:

Under "[75] Inventors" delete "Hidehiko Tanaka"

Under "Abstract" line 1, please delete "issue to" and insert --issued-- and line 7, please delete "there for" therefor Signed and Sealed this Seventeenth Day of April, 2001

Attest:

NICHOLAS P. GODICI

*Attesting Officer*   *Acting Director of the United States Patent and Trademark Office*